United States Patent [19]

Tamura et al.

[11] Patent Number: 5,128,888
[45] Date of Patent: Jul. 7, 1992

[54] ARITHMETIC UNIT HAVING MULTIPLE ACCUMULATORS

[75] Inventors: Glenn A. Tamura, Austin, Tex.; Prem Sobel, Pondicherry, India

[73] Assignee: Advanced Micro Devices, Inc., Sunnyvale, Calif.

[21] Appl. No.: 504,127

[22] Filed: Apr. 2, 1990

[51] Int. Cl.⁵ .............................................. G06F 7/38
[52] U.S. Cl. ...................................... 364/748; 364/736
[58] Field of Search .................. 364/754, 736, 748, 730

[56] References Cited

U.S. PATENT DOCUMENTS

| | | | |
|---|---|---|---|
| 4,075,704 | 2/1978 | O'leary | 364/748 |
| 4,683,547 | 7/1987 | DeGroot | 364/748 |
| 4,766,416 | 8/1988 | Noujaim | 364/736 X |
| 4,766,564 | 8/1988 | DeGroot | 364/748 |
| 4,901,267 | 2/1990 | Birman et al. | 364/736 |
| 4,916,651 | 4/1990 | Gill et al. | 364/736 |
| 4,945,506 | 7/1990 | Baji et al. | 364/736 |
| 4,958,312 | 9/1990 | Ang et al. | 364/754 |
| 4,961,162 | 10/1990 | Nguyenphu et al. | 364/748 |
| 4,996,661 | 2/1991 | Cox et al. | 364/748 |
| 5,010,509 | 4/1991 | Cox et al. | 364/748 |

*Primary Examiner*—Tan V. Mai
*Attorney, Agent, or Firm*—Johnson & Gibbs

[57] ABSTRACT

An arithmetic logic unit includes structure for calculating in at least two stages, this structure including substructure for calculating in each of the at least two stages at least partially at the same time and substructure for ensuring the substructure for calculating in each of the at least two stages performs only one calculation at a time. Accumulators that work with pipe stages of a floating point unit may form all of part of the calculating structure. A method of performing calculations includes the steps of separating the calculations into at least two stages and separately accumulating the results of the stages using at least two accumulators, one each accumulator for each calculation at each of the at least two stages.

9 Claims, 4 Drawing Sheets

ARITHMETIC UNIT HAVING MULTIPLE ACCUMULATORS

CROSS REFERENCES TO RELATED APPLICATIONS

This application is related to the following U.S. Patent Applications:

| Ser. No. | TITLE | INVENTOR | U.S. Pat. No. |
|---|---|---|---|
| 07/503,817 | Pipelined Floating Point Processing Unit | Perlman, et al. | 5,053,631 |
| 07/503,819 | Normalizing Pipelined Floating Point Processing Unit | Gupta, et al. | 5,058,048 |
| 07/505,351 | Apparatus and Method For Collecting Boolean Conditions of Multiple Operations | McMinn, et al. | |
| 07/505,350 | A Special Carry Save Adder For High Speed Iterative Division | Shah, et al. | |
| 07/503,818 | High Speed Mixed Radix Adder | Lynch, et al. | |
| 07/503,822 | Radix 4 Carry Lookahead Tree and Redundant Cell Therefor | Lynch, et al. | |
| 07/504,324 | High Speed Divider With Square Root Option | Lynch, et al. | |

All cross referenced applications are filed on even date herewith and assigned to the assignee of the present invention. All of the cross referenced applications are hereby incorporated herein in their entirety by this reference thereto.

BACKGROUND OF THE INVENTION

1. Field of the Invention

The present invention relates to arithmetic units for computing systems and, more particularly, to floating point arithmetic units.

2. Description of Related Art

Many computer programs require a large number of floating point arithmetic operations. Consequently, a large number of the instructions executed by a computer in which such programs are run are floating point instructions. For such programs, the greater the number of floating point arithmetic instructions that can be executed per cycle, the faster the machine speed of operation.

The prior art is replete with examples of efforts to speed up floating point processing time. U.S. Pat. No. 4,683,547 to DeGroot, for example, discloses a floating point arithmetic unit which allows two floating point results to be produced each cycle. That same patent discusses prior art teachings of arithmetic units which allow multiple arithmetic operations to be executed at once. Yet another approach is shown in U.S. Pat. No. 4,075,704 to O'Leary, that approach involving constructing a two stage pipelined floating point adder.

Notwithstanding the teachings of the patents described above, and similar patents, nowhere is there known to be disclosed or suggested in the prior art an apparatus and method as described and claimed herein, which apparatus and method have highly desirable characteristics relating to system speed.

SUMMARY OF THE INVENTION

An arithmetic unit includes means for calculating in at least two stages, this means including means for calculating each of the at least two stages at least partially at the same time, and means for ensuring the means for calculating each of the at least two stages performs only one calculation at a time. In embodiments of the present invention, accumulators that work with pipe stages of a floating point unit form part of the calculating means. The present invention also encompasses a method of performing calculations comprising the steps of separating the calculations into at least two stages and separately accumulating the results of the stages using at least two accumulators, one accumulator for each of said at least two stages. In a preferred embodiment of the present invention, there are four accumulators.

In embodiments of the present invention the arithmetic unit may be a pipelined computer arithmetic unit. Of course, this pipelined computer arithmetic unit may be configured to perform floating point calculations.

According to the teachings of the present invention the means for calculating each of the at least two stages at least partially at the same time may include at least two accumulators. Each of the at least two accumulators may be operatively associated with a separate stage. Further, the means for ensuring the means for calculating each of the at least two stages performs only one calculation at a time may include at least two control tokens, one control token operatively associated with each accumulator.

Embodiments of the present invention may also include calculation error detecting means, which calculation error detecting means may include an ORed status register.

The present invention also encompasses a pipelined computer arithmetic unit for calculating in at least two pipe stages, this pipelined computer arithmetic logic unit including at least two accumulators, each of the at least two accumulators operatively associated with a separate pipe stage; and means for indicating availability or unavailability for operation of each of the at least two accumulators. Certain of these embodiments of the present invention may perform floating point calculations.

The method of the present invention, discussed above, may include the step of detecting errors with an ORed status register.

The method of the present invention may also include the step of indicating when results of the stages are obtained. The step of indicating when results of the stages are obtained may involve at least one control bit for each pair of accumulators.

Accordingly, it is an object of the present invention to provide an arithmetic logic unit that can execute independent parallel or related pipelined calculations.

Another object of the present invention is to maximize speed of pipeline architecture.

Yet another object of the present invention is to provide an arithmetic logic unit that uses all hardware concurrently, thereby maximizing performance.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE INVENTION

Figure 1:
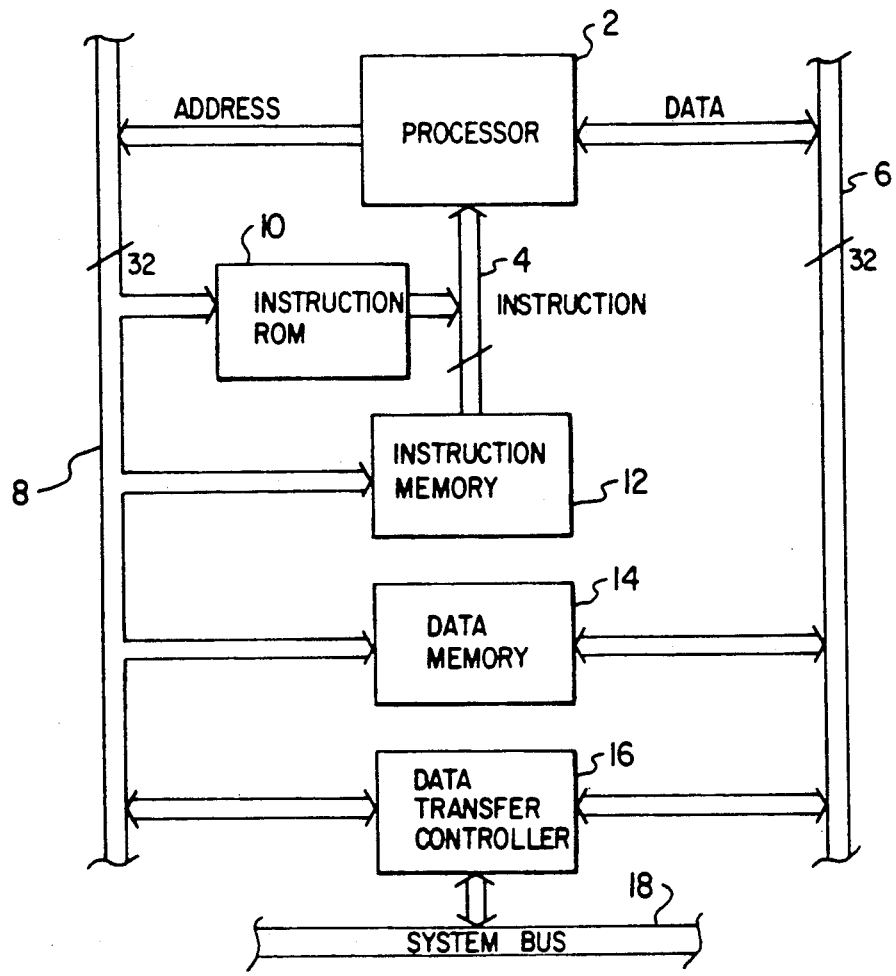
FIG. 1 is a block diagram of a computer system including a floating point arithmetic unit according to the teachings of the present invention incorporated into a processor therein.

Referring now to FIG. 1, a simplified system diagram of a computing system including a processor 2 is shown therein. The purpose of this diagram, as well as several subsequent diagrams, is to illustrate an environment in which multiple, interleaved accumulators according to the present invention may be usefully incorporated.

Processor 2 accesses external instructions and data using three non-multiplexed buses. These buses may be referred to collectively as a channel. The channel comprises a 32-bit bus 4 for instruction transfers, a second 32-bit bus 6 for data transfers, and a third address bus 8 which is shared between instruction and data accesses. The address bus 8 is pipelined, so that it can be released before an instruction or data transfer is completed. This allows a subsequent access to begin before the first has completed, and allows the processor 2 to have two accesses in progress simultaneously.

The overall system shown in FIG. 1 may also be seen to comprise an instruction ROM 10 and instruction memory 12, both operatively connected between the address bus 8 and instruction bus 4. Additionally, a data memory 14 and data transfer controller 16 are shown to be operatively connected between the address bus 8 and data bus 6. Further, the data transfer controller 16 is also operatively connected so as to send signals onto, and receive signals from, a system bus 18.

Figure 2:
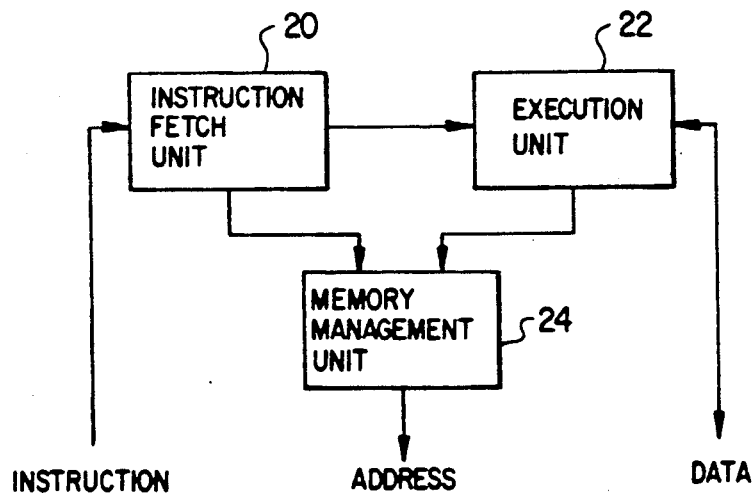
FIG. 2 is a block diagram of subsystems of the processor shown in FIG. 1.

Referring now to FIG. 2, a data flow diagram of the processor 2 is shown therein so that a better understanding of that processor 2 may be obtained.

Processor 2 implements a four-stage pipeline for instruction execution, the four stages being "fetch", "decode", "execute" and "write-back". The instruction fetch unit 20 of processor 2 fetches instructions, and supplies instructions to other functional units. The unit 20 incorporates an instruction prefetch buffer, a branch target cache, and a program counter unit. These subunits will be discussed further below with reference to FIG. 3. All components of the instruction fetch unit 20 operate during the fetch stage of the processor pipeline.

Processor 2 also includes an execution unit 22. The execution unit 22 includes a register file, an address unit, an arithmetic/logic unit, a field shift unit, a prioritizer, and a floating point processing unit. These subunits, like the subunits of the instruction fetch unit 20, area also discussed further below with reference to FIG. 3. The register file and address unit operate during the decode stage of the pipeline. The arithmetic/logic unit, field shift unit, and prioritizer operate during the execute stage of the pipeline. The register file operates during the write-back stage.

Still further with reference to FIG. 2, the processor 2 may be seen to include a memory management unit 24. The memory management unit 24 performs address translation and memory-protection functions for all branches, loads and stores. 1 The unit 24 operates during the execute stage of the pipeline, so the physical address that it generates is available at the beginning of the write-back stage.

Interconnection of the units 20, 22 and 24 in processor 2, as well as their interfaces with system buses, are also shown in FIG. 2.

Figure 3:
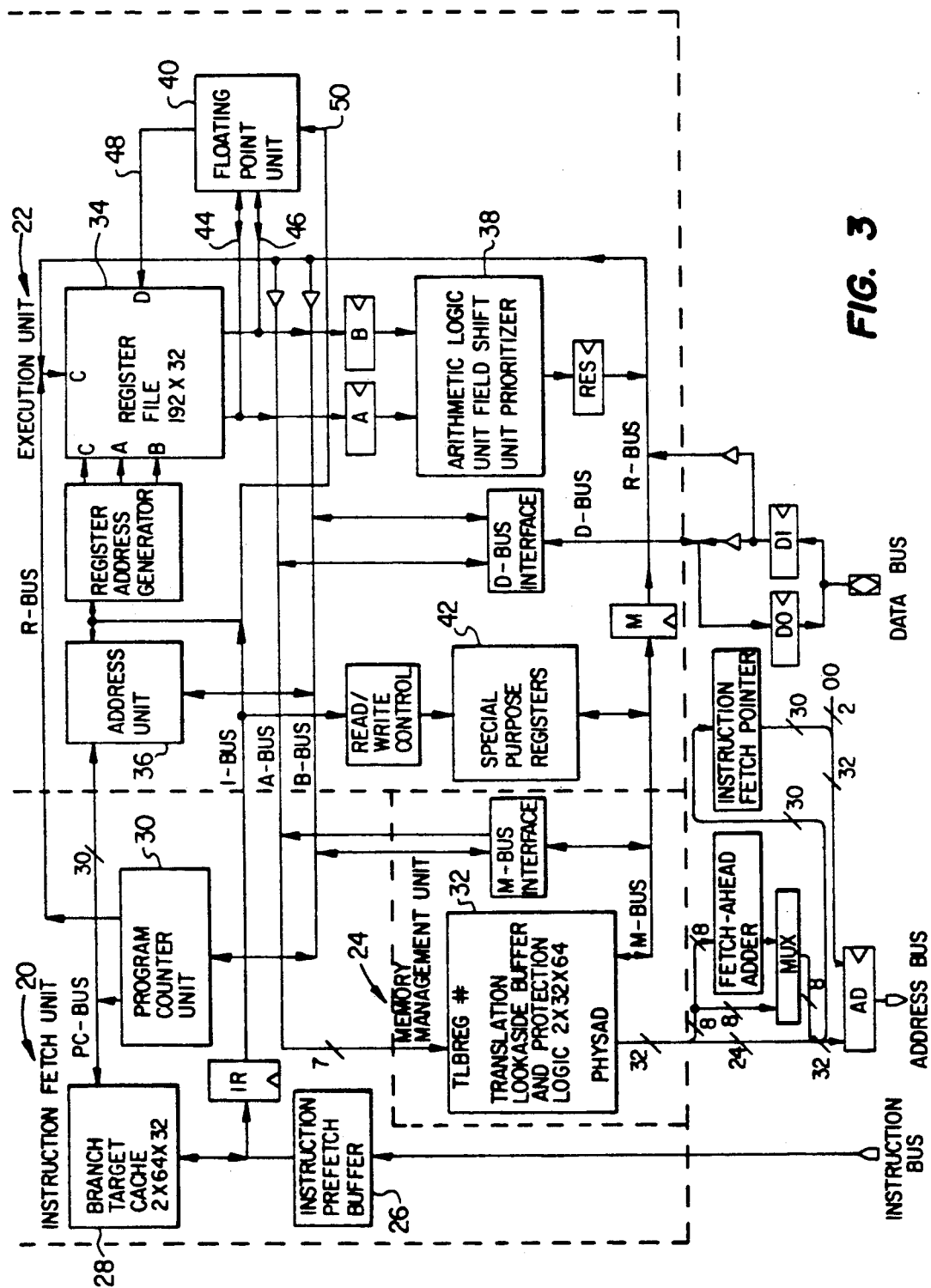
FIG. 3 is a more detailed block diagram of the subsystems discussed with reference to FIG. 2.

Referring now to FIG. 3, even further details regarding the subcomponents of the processor 2 are shown diagrammatically. This processor may be seen to comprise an instruction fetch unit 2, a memory management unit 4, and an execution unit 6. Additionally, the instruction fetch unit 20 may be seen to comprise an instruction prefetch buffer 26, a branch target cache 28, and a program counter unit 30. As also previously mentioned, the memory management unit 24 may be seen to comprise means 32 for performing address translation and memory protection functions for all branches, loads and stores. Finally, the execution unit 22 may be seen to comprise a register file 34, an address unit 36, an arithmetic/logic unit 38, a field shift unit (also designated by reference numeral 38), a prioritizer (also designated by reference numberal 38), and a floating point processing unit 40. Although various other elements (e.g., special purpose registers 42) and interconnection details are shown in FIG. 3, because they are only peripherally related to the present invention, and because the diagram alone is sufficiently communicative to those skilled in the art to understand processor 2 well, further details regarding all units other than the floating point unit 40 and other elements to which it is operatively connected are not set forth herein.

Several noteworthy aspects of the floating point unit 40 may be seen with reference to FIG. 3. Recognizing that the floating point unit 40 manipulates A and B operands, those A and B operands come from the register file 34 via A and B buses 44, 46, respectively. It may also be noted that A and B buses 44, 46 are two-way buses, so that operands may be read out of the floating point unit 40 into the register file 34. Results of manipulations, e.g., calculations, by the floating point unit 40 are read into the register file via result bus 48. Also, instructions for operation of the floating point unit 40 are transmitted thereto via processor instruction bus 50.

Figure 4:
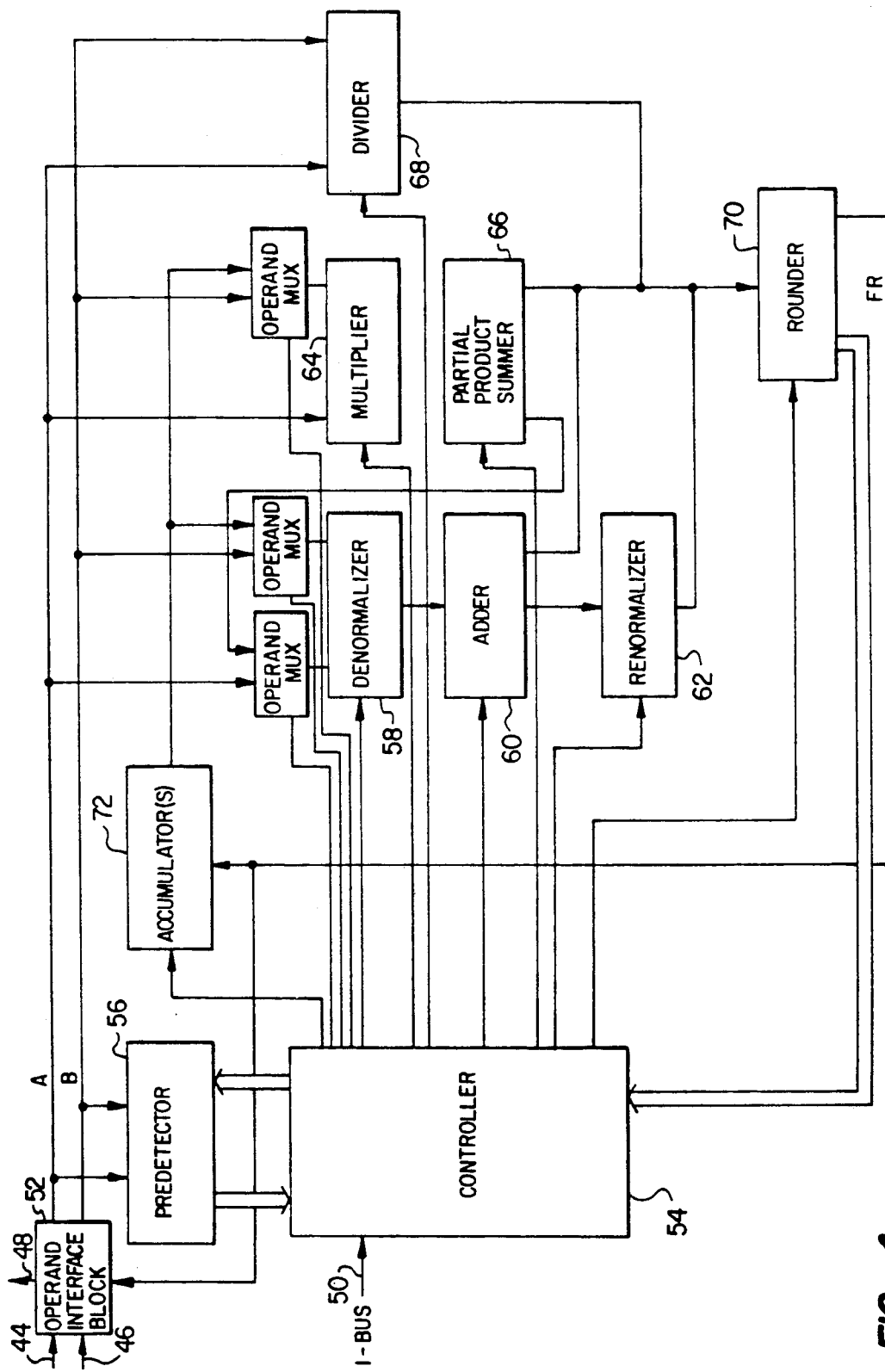
FIG. 4 is a block diagram of a floating point arithmetic unit according to the teachings of the present invention.

Referring now to FIG. 4, various subcomponents of a pipelined floating point processing unit constructed in accordance with the teachings of the present invention may now be seen.

The various interface points discussed above with reference to FIG. 3 are similarly shown and labelled in this FIG., i.e., operands from the register file are fed into the floating point unit via A and B buses 44, 46, results leave the floating point unit via the result bus 48, and instructions are transmitted to the floating point unit via the instruction or I-bus 50. With special reference to FIG. 4, the A bus, B bus and result bus may be seen to be operatively connected (although it should be specifically noted that this type of connection is not a necessary part of certain embodiments of the present invention) to an interface unit 52 within the floating point unit, whereas the I-bus is operatively connected to a controller 54 therein.

It is well-known that when numbers for processing, i.e., A and B operands, are input to a floating point unit such as floating point unit 40, the floating point unit performs the desired (or instructed) arithmetic operations, and outputs the result on a result bus such as bus 48. Floating point units such as floating point unit 40 may process both floating point and integer numbers, and support both 32 bit (single-precision) and 64 bit (double precision) formats for each. Additionally, the floating point unit 40 may handle conversion of integers to floating point, and the reverse, as well as support IEEE, DEC and IBM formats. Each of the above aspects of floating point unit 40 is discussed further in the related cases referred to above and incorporated herein by reference.

Referring still further to FIG. 4, those skilled in the art should appreciate the function and operation of most of the various floating point unit subcomponents shown therein. Those subcomponents which operate in a generally conventional individual manner, and are thus not discussed in detail herein, include predetector 56, denormalizer 58, adder 60, renormalizer 62, multiplier 64, partial product summer 66, divider 68, and rounder 70. Some very important aspects of these subcomponents and the interoperation thereof exist however, and are discussed at length in the related cases, to which the reader is urged to refer.

At this point it can be noted that the present invention specifically teaches an apparatus and method for increasing issue rate of multiply-accumulate operations. In general, multiply-accumulate operations involve obtaining a result from three operands. This result is obtained by multiplying two of the operands to obtain a preliminary result, and then adding the third operand to that preliminary result to obtain a final result. Multiply-accumulate operations are frequently undertaken in computer systems because they lend themselves to multiplying matrices, which is common in 3-D graphics operations.

More specifically, in multiplication of one 4 by 4 matrix times another 4 by 1 matrix, the first entry in the first row of the first matrix is multiplied times the first entry in the first column of the second matrix, and the second element of the first row of the first matrix is multiplied times the second entry in the first column of the second matrix, and so on. The various multiplication results are stored in an accumulator, e.g., accumulator 72 in FIG. 4, and each succeeding result is added to the result of the previous multiplication in the accumulator 72. Based on the foregoing, it should be clear to those skilled in the art that conventional 4 by 4 matrix times 4 by 4 matrix multiplication involves handling four different results, those four different results arising from four different computations that must be undertaken to complete the overall operation. Handling of the four different results has some impact on embodiments of the present invention, which are described further below with special reference to description of accumulator(s) 72.

As previously mentioned, the floating point unit 40 is pipelined. Because this aspect also has some impact on embodiments of the present invention, further details regarding pipelining immediately follow.

It should be understood that because of pipelining, multiple multiplication operations can be undertaken at the same time, in different stages. For example, multiplication involves operation of both multiplier 64 and partial product summer 66. Any single multiplication operation will go through both of those stages, but not at the same time. Thus, because of pipelining, one multiplication operation can be in the partial product summer 66 stage, while another is in the multiplier 64 stage of the same unit 40.

Individual multiply-accumulate operation proceeds as follows. First, A and B operands are read into the multiplier 64. The result is sent to the partial product summer 66, and then on to the denormalizer 58. At the same time, an operand in the accumulator 72 is sent to the denormalizer 58 as a second input thereto. From there, the operation proceeds to the adder 60, the renormalizer 62, the rounder 70, and then back to the accumulator 72.

Figure 6:
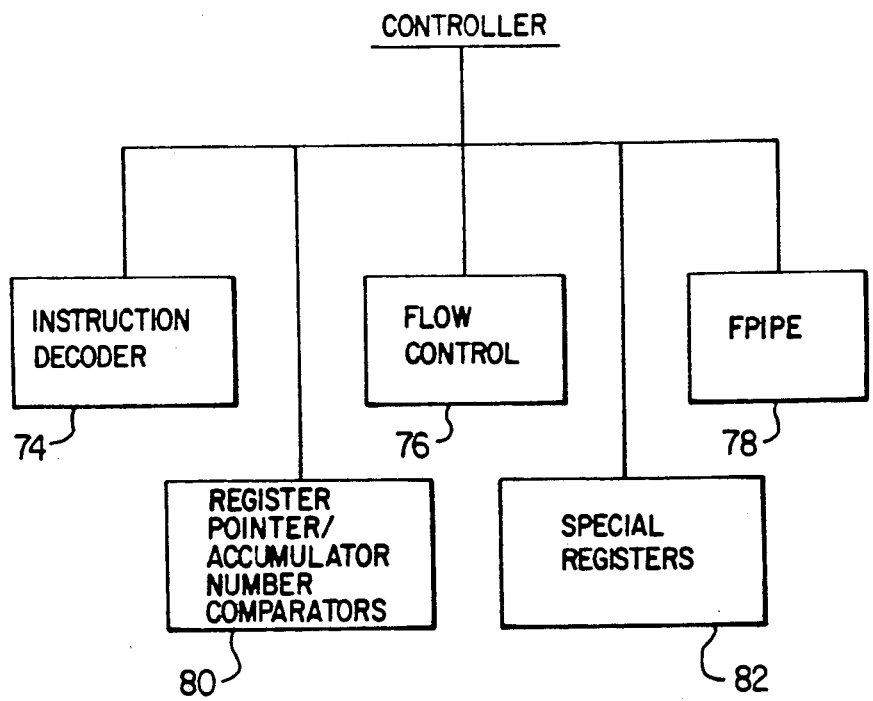
FIG. 6 depicts major subcomponents of a controller of a floating point unit according to the teachings of the present invention.

An element of the floating point unit that plays an important role in a number of embodiments of the present invention is the controller 54, various subelements of which are shown in FIG. 6 (all of which are interconnected, although details of these interconnections are not shown in FIG. 6). Controller 54 performs a number of functions, including decoding instructions (via instruction decode means 74) from the I-bus 50, providing information to other floating point blocks (e.g., as to whether integers or floating point numbers are being manipulated and as to whether single- or double-precision is being used), and providing control signals to the floating point unit function blocks (e.g., the adder 60, the multiplier 64 and the divider 68). The controller 54 also includes a flow control block 76 and yet another block 78 ("FPIPE") that plays an important role in embodiments of the present invention. With reference to FIG. 4, this FPIPE block may be envisioned as a configuration of latches corresponding to the denormalizer 58, the adder 60, the renormalizer 62, the multiplier 64, the partial product summer 66, the divider 68 and rounder unit 70, those latches being similarly connected as are the aforementioned subelements of the floating point unit. The purpose of these latches will be discussed further below. Also, part of the FPIPE portion of the controller 54 is register pointer comparators 80. In an embodiment of the present invention actually constructed by the assignee of the present invention, these register pointer comparators compare register pointers of an operation that is in decode against all of the destination registers of the operation in the floating point unit. The purpose of this is to ensure writing to files is effected at the proper time, to maintain correctness. Similarly, the controller 54 includes accumulator number comparators (also designated by reference numeral 80 in FIG. 6), which perform essentially the same operation as do the register pointer comparators, except the accumulator number comparators operate on the accumulators 72.

Figure 5:
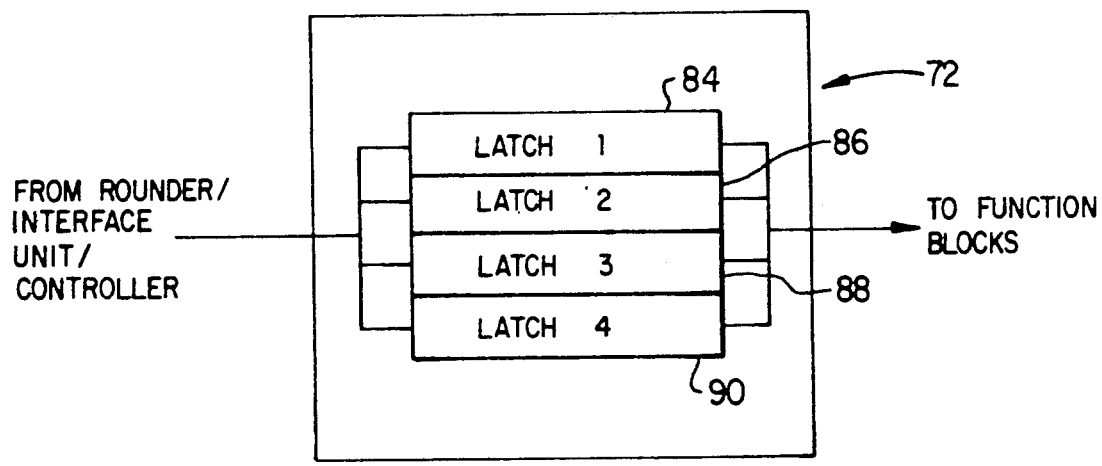
FIG. 5 is a block diagram of a portion of an accumulator in a floating point unit according to the teachings of the present invention.

General principles regarding the present invention may now be fully understood. As previously mentioned, floating point multiply and add (subtract) takes a long time in hardware. Thus, it is desirable to have a means for increasing issue rate of results of those operations. According to the teachings of the present invention, this means can involve breaking the various required calculations into parts, or stages, and then to pipline those different stages of the calculations through the floating point unit 40. Referring to FIG. 4, a component of this means, an accumulator section, is shown in block diagram form and designated by reference numeral 72. Further details regarding element 72 are shown in FIG. 5. With reference to that FIG., element 72 may be seen to comprise a plurality of accumulators 84, 86, 88, 90. According to the teachings of the preferred embodiment of the present invention, element 72 comprises one accumulator per pipe stage of calculations being performed by the unit 40 so that each stage of the pipeline can work on a calculation using a different accumulator. Having such a configuration, the hardware shown in FIG. 4 can multiply-accumulate using the multiple accumulators 84, 86, 88, 90, with various pipe stages working on up to four different stages of the overall calculation simultaneously.

An important part of controlling accumulator 84, 86, 88, 90 operation is ensuring that succeeding operations utilizing a given accumulator begin only when preceding operations which write to that accumulator have been completed. To accomplish this, the present invention provides hardware interlocks or waits to prevent or stall succeeding operations if necessary. Referring back to FIG. 4 and to FIG. 6 this means should be understood to comprise the latches in the FPIPE section of the controller 54. These latches allow inclusion of a unique token (i.e., a value of a bit; e.g., a "1" or a "0") in each accumulator loop, the purpose of which token is to provide a means of advising succeeding operations on availability or unavailability of an accumulator. For example, if an instruction requires an unavailable, i.e., not yet completed accumulator calculation, it can be forced to wait until a control token is seen at the output of the calculation pipeline. More specifically, it should be understood that the accumulator numbers follow, or "shadow", where the multiply accumulate operation is in the actual floating point unit. Thus, when a multiply accumulate operation first begins, the accumulator number is held in a latch or latches representing the multiplier 64. When the multiply accumulate operation goes to the second, or partial summer 66 stage, the accumulator number in FPIPE goes to latches or a latch representing the partial summer stage. When the multiply accumulate operation reaches the adder, because it is known that the partial summer has a multiply-accumulate operation going on within it, and because the accumulator number that it is referring to is known, an accumulator can be read out at that time and sent to the denormalizer. The adder can be controlled to take the multiply result and the value in the accumulator, and the accumulator number in FPIPE can be put into the denormalizer latch. Thus, effectively, the actual operation and control token flow take place in parallel and, therefore, correctness can be guaranteed and hardware interlocks (or waits) provided by the control bit mechanism.

In embodiments of the present invention, traps are not taken because not enough information is available at the start of the multiply accumulate operation to determine if the operation might trap. Normally, if an operation might trap, the flow of instructions in the whole chip is stopped until that operation finishes. In the embodiment of the present invention that has actually been constructed by the assignee of the present invention, more than one trap is not allowed to arise at the same time. Thus, within the framework of the present invention, if the pipe were held if there was a chance of taking a trap; which would be, again, unknown; each multiply accumulate would take six cycles and nothing else could be done at the same time. So by not taking a trap, or by knowing at the start that the operation is not trapping the pipe need not be held. Thus, multiply accumulate operations may be pipelined through the floating point unit, one after another.

It is important to understand, however, that as a substitute for traps in embodiments of the present invention a sticky (ORed) status register 82 is included within the controller 54 (see FIG. 6). More broadly, the sticky status register is part of the special registers subcomponent. This subcomponent includes a floating point environment register which stores trap mask bits, and random logic for taking traps and setting sticky bits. In the multiply accumulate operation described herein, applicable sticky bits include overflow, underflow, inexact, not a number, and invalid operation. As those skilled in the art should be aware, a sticky status register can be examined at any time, e.g., at the end of a long calculation, to verify that no errors were encountered. Also, as those skilled in the art should know, sticky status bits, once they are set, stay set until they are cleared by the user.

Based on the foregoing, it should be clear that the present invention provides an efficient means for effecting multiply and add in floating point hardware. The present invention involves pipelining stages of calculations, and then accumulating results of those stages in a multiple accumulator section. A control block (including waits) and a status register (to detect errors) are also taught as includable sections in embodiments of the present invention.

Those skilled in the art will recognize that many modifications and variations besides those specifically mentioned may be made in the structure and techniques described herein without departing from the concept of the present invention. Accordingly, it should be understood that, within the scope of the appended claims, the present invention may be practiced otherwise than as specifically described herein.

What is claimed is:

1. A pipelining floating point processor comprising:
    first and second arithmetic operation units;
    means for providing input operands to said first and second arithmetic operation units;
    at least two accumulators for storing the results of arithmetic operations performed by said first arithmetic operation unit;
    means for providing the results stored in said at least two accumulators as accumulated input operands to said second arithmetic operation unit;
    first staging means for sequencing said input operands and said accumulated input operands to said second arithmetic unit; and
    second staging means for latching intermediate results of arithmetic operations performed by said first arithmetic operation unit using said input operands and intermediate results produced by said second arithmetic operation unit using said input operands and said accumulated operands;
    wherein said first and second staging means and at least two said accumulators provide for the pipelining of compound arithmetic operations performed by said floating point processor using said input and accumulated operands through said floating point processor.

2. A pipelined floating point processor as recited in claim 1, further comprising calculation error detecting means.

3. A pipelined computer arithmetic unit as recited in claim 2, wherein said calculation error detecting means comprises an ORed status register.

4. A pipelining floating point processor comprising:
- a floating point multiply unit having first and second inputs and an output;
- a floating point add unit having input means and an output;
- means for providing input operands to said multiply and add units;
- at least two accumulators for storing the results of arithmetic operations performed by said multiply and add units;
- means for providing the results stored in said at least two accumulators as accumulated operands to said multiply and add units; and
- staging means for sequencing said input operands, results produced by said multiply and add units using said input operands, and results produced by said multiply and add units using said input operands and said accumulated operands.

5. A pipelining floating point processor as recited in claim 4, further comprising calculation error detecting means.

6. A piplining floating point processor as recited in claim 5, wherein said calculation error detecting means comprises an ORed status register.

7. A pipelining floating point processor comprising:
- a floating point multiply unit having first and second inputs and an output;
- a floating point add unit having first and second inputs and an output;
- means for providing input operands to said multiply and add units;
- at least two accumulators for storing the results of arithmetic operations performed by said multiply and add units, said at least two accumulators arranged in an interleaved fashion between stages of multiply and add loops arising during operation of the multiply and add units respectively;
- means for providing the results stored in said at least two accumulators as accumulated operands to said multiply and add units; and
- staging means for sequencing said input operands, results produced by said multiply and add units using said input operands, and results produced by said multiply and add units using said input operands and said accumulated operands.

8. A pipelining floating point processor as recited in claim 7, further comprising calculation error detecting means.

9. A pipelining floating point processor as recited in claim 8, wherein said calculation error detecting means comprises an ORed status register.

* * * * *